United States Patent [19]

Carter et al.

[11] Patent Number: 4,841,587

[45] Date of Patent: Jun. 27, 1989

[54] MAT WITH SOUND SYSTEM

[76] Inventors: John E. Carter, 705 W. 29th St., #6, Bellevue, Nebr. 68005; David R. Hernandez, 298 Fairchild Cir., Offutt Air Force Base, Nebr. 68113

[21] Appl. No.: 300,825

[22] Filed: Jan. 23, 1989

[51] Int. Cl.[4] ........................... A47G 9/06; H04B 1/06

[52] U.S. Cl. ........................................... 5/419; 5/420; 5/462; 455/344

[58] Field of Search ............................ 5/413, 417–420, 5/434, 436, 437, 442, 462, 508; 190/2; 455/344

[56] References Cited

U.S. PATENT DOCUMENTS

| | | | |
|---|---|---|---|
| 1,712,158 | 5/1929 | Neal | 5/442 X |
| 2,505,492 | 4/1950 | Heider | 5/420 X |
| 2,788,533 | 4/1957 | Bornstein | 5/420 X |
| 2,898,609 | 8/1959 | Storie | 5/419 |
| 2,958,769 | 11/1960 | Bounds | 5/442 X |
| 3,946,316 | 3/1976 | Hough | 455/344 |
| 4,097,944 | 7/1978 | Yulish | 5/419 |

FOREIGN PATENT DOCUMENTS 8704934 8/1987 PCT Int'l Appl. .

*Primary Examiner*—Gary L. Smith
*Assistant Examiner*—Michael F. Trettel
*Attorney, Agent, or Firm*—Zarley, McKee, Thomte, Voorhees & Sease

[57] ABSTRACT

A musical mat of the present invention includes a mat portion having a pillow connected to one end thereof. The mat includes a casing with a resilient padding material therein for supporting a person. A pair of speakers are mounted in the pillow and spaced apart so that a person can lie with his head between the speakers. A radio, or other audio transmitting device, is maintained in position within a pocket on the mat, and may be connected to a plug which is electrically connected to the speakers in the pillow, to transmit the audio signal to the speakers. The electrical conductor connecting the plug to the speakers is mounted within the mat casing and within the pillow, such that the wires do not interfere with the person lying on the mat. The pocket for retaining the audio transmitter is selectively fastened to the mat, to allow removal of the pocket and transmitter for use of the mat without the sound system. A series of solar panels is mounted along the upper face of the lower end of the mat, which are selectively electrically connected to allow an audio-transmitter, so as to supply power from the solar panels. A series of transverse and parallel seams are sewn completely through the mat so as to allow the mat to be rolled up into a cylinder without the padding material bunching within the mat casing. In a second embodiment, a fastener strip is mounted along the longitudinal sides, and bottom edge of the mat. A cover blanket is selectively fastened to the fasteners to form a sleeping bag structure.

11 Claims, 5 Drawing Sheets

MAT WITH SOUND SYSTEM

TECHNICAL FIELD

The present invention relates generally to transportable mats, and more particularly to a combination mat and sound system.

BACKGROUND OF THE INVENTION

Prior to the present invention, there have existed a number of patents directed to radio speakers and/or radio receivers and speakers within the body of a pillow. Furthermore, mats have long been utilized as a device to pad the surface upon which a person will lay down. However, neither of these broad concepts have been combined in a way which provides an easily transportable mat with a pillow fixed thereto having a stereo sound system built directly within the pillow.

Carrying bags adapted to be utilized in one form as a mat and in another form as a handbag have also been known in the prior art. One example is disclosed in U.S. Pat. No. 4,681,195, which provides some built-in, relatively rigid compartments which will hold various items, and also includes a pair of handles such that the mat may be folded in half like a suitcase and transported as desired. The main problem with such devices is in the use of rigid components which add weight and cumbersome dimensions for transporting the device. Furthermore, no pillow is provided for the user of the mat.

A problem with the prior art pillows having speakers therein, is in the comfort of using such a pillow. Typically, the speakers are located directly below the location of the head of the user, thus reducing the amount of "stuffing" actually utilized by the person on the pillow.

Another problem with prior art pillows having radios therein, is in the fact that the radio in the pillow cannot be interchanged with other music-playing devices. Nor is it easy to reach the tuning and volume controls for the radio.

Finally, frequent use of a pillow with a radio or the like therein requires frequent changing of the batteries, since typically an electrical outlet is not convenient to the location where the mat is being used.

It is therefore a general object of the present invention to provide an improved combination transportable mat having a pillow and music system.

Another object of the present invention is to provide a mat which avoids the use of large rigid components, to increase the transportability of the mat.

A further object is to provide a musical mat with speakers located so as to allow full use of the thickness of the pillow.

Still another object of the present invention is t provide a musical mat having interchangeable sound producing devices.

Yet a further object of the present invention is to provide a musical mat having a sound system which does not require batteries.

These and other objects of the present invention will be apparent to those skilled in the art.

SUMMARY OF THE INVENTION

The musical mat of the present invention includes a mat portion having a pillow connected to one end thereof to provide a surface for a person to lay on. The mat includes a casing with a resilient padding material therein for supporting a person. A pair of speakers are mounted in the pillow and spaced apart so that a person can lie with his head between the speakers. A radio, or other audio-transmitting device, is maintained in position within a pocket on the mtt, and may be connected to a plug which is electrically connected to the speakers in the pillow, to transmit the audio signal to the speakers. The electrical conductor connecting the plug to the speakers is mounted within the mat casing and within the pillow, such that the wires do not interfere with the person lying on the mat. The pocket for retaining the audio transmitter is selectively fastened to the mat, to allow removal of the pocket and transmitter for use of the mat without the sound system.

A series of solar panels is mounted along the upper face of the lower end of the mat, which are electrically connected to a second plug via a conductor mounted within the mat casing. The second plug projects from the casing adjacent the first plug to allow an audio-transmitting device to be powered by the solar panels.

A series of transverse and parallel seams are sewn completely through the mat so as to allow the mat to be rolled up into a cylinder without the padding material bunching within the mat casing. A pair of connector straps will secure the mat in its rolled-up cylindrical orientation to allow ease of transportation. A carrying strap is mounted transversely to the lower face of the mat which forms a handle for transporting the mat when in its rolled-up orientation.

In a second embodiment, a fastener strip is mounted along the longitudinal sides and bottom edge of the mat. A cover blanket is selectively fastened to the fasteners to form a sleeping bag structure.

DESCRIPTION OF THE PREFERRED EMBODIMENT

Figure 1:
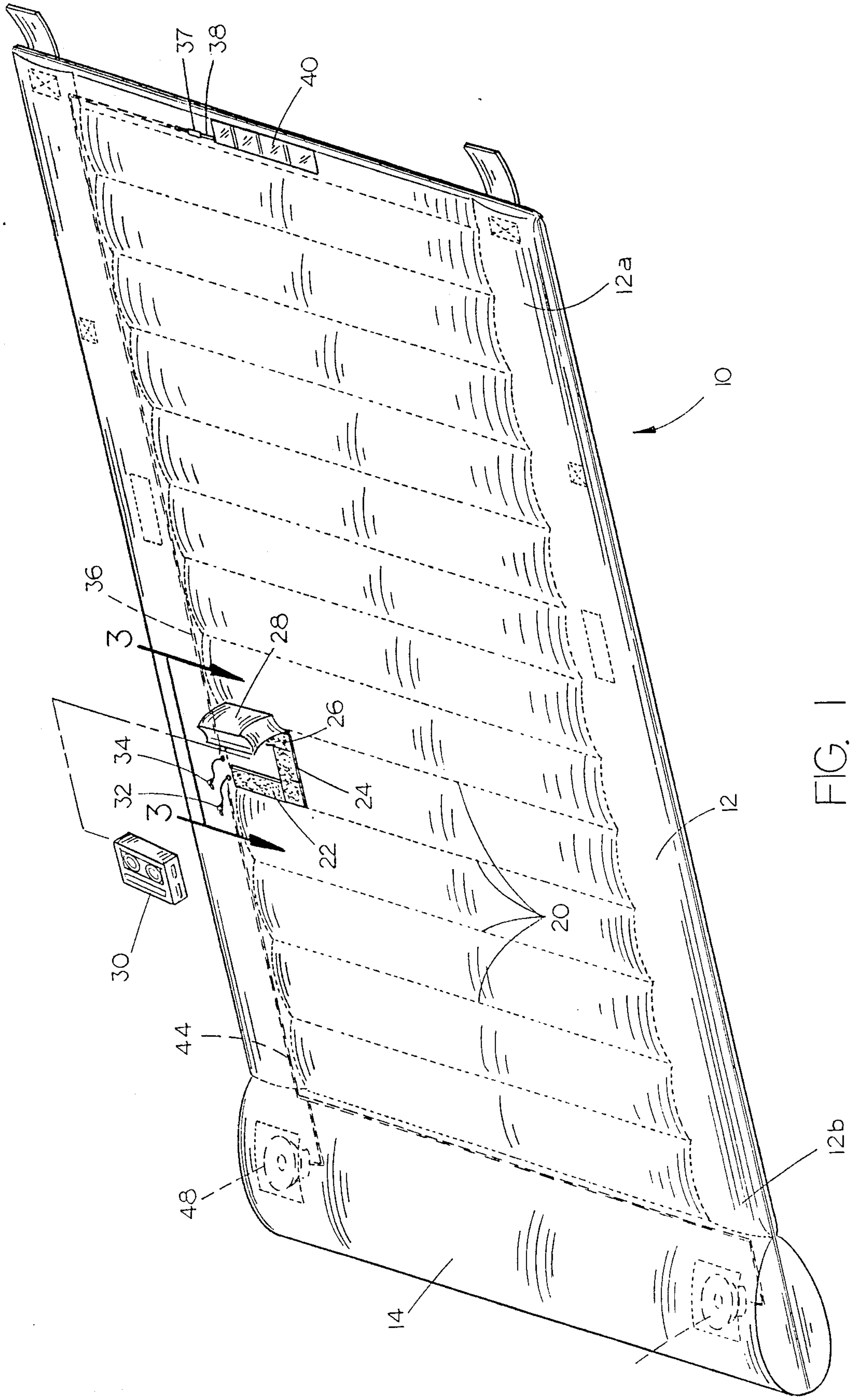
FIG. 1 is a perspective view of the present invention rolled out to be used as a mat.
Figure 3:
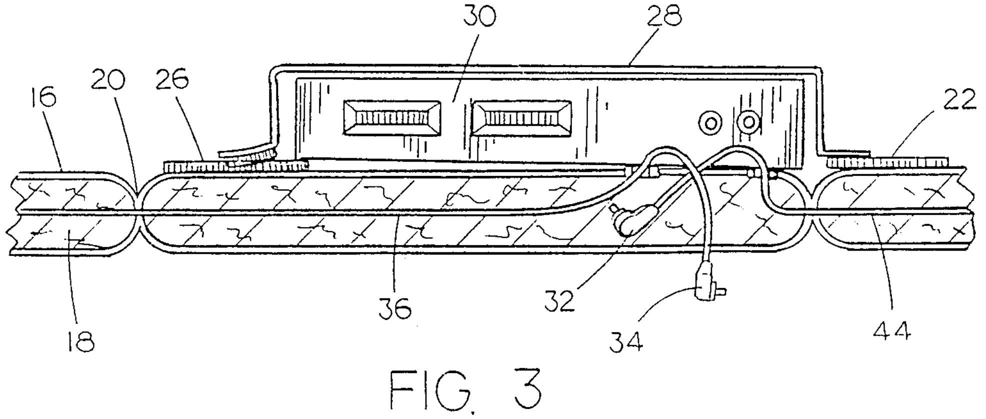
FIG. 3 is a sectional view of the mat taken at lines 3—3 in FIG. 1.
Figure 4:
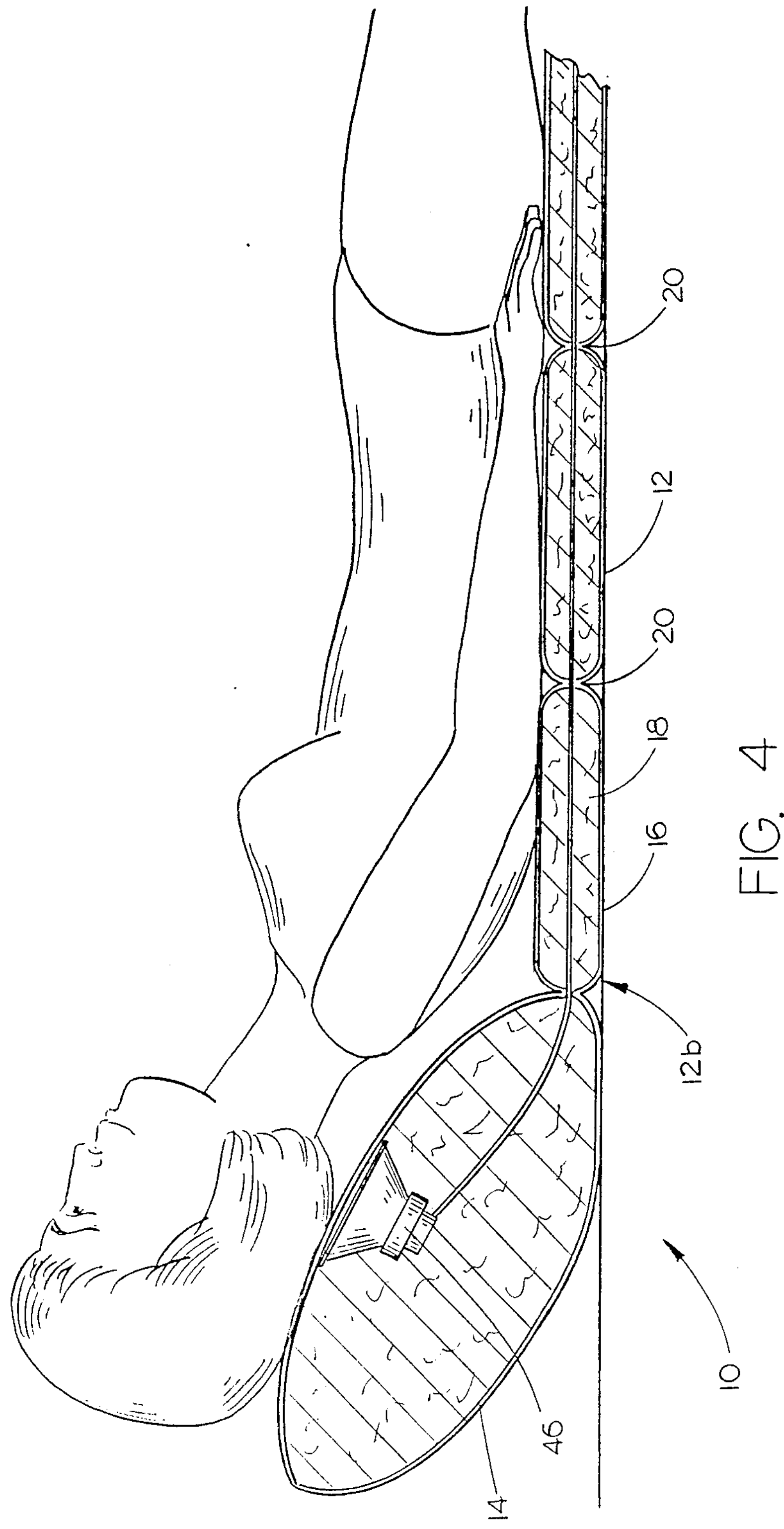
FIG. 4 is a longitudinal sectional view through a portion of the mat, with a person thereon.

Referring now to the drawings, in which similar or corresponding parts are identified by the same reference numeral throughout the drawings, and more particularly to FIG. 1, the musical mat of the present invention is designated generally at 10 and includes a padded mat 12 having a pillow 14 attached at one end thereof. Mat portion 12 includes a fabric casing 16 which contains a layer of padding 18 (see FIG. 3) therein. A plurality of transverse seams 20 are sewn through the casing 16 and 18, in parallel lines, such that the entire mat may be easily rolled into a cylindrical form. Without such seams 20, the padding material could bunch up and make rolling of the mat difficult. Seams 20 also assist mat 10 in conforming to uneven ground surfaces.

A series of Velcro® (a trademark for an interengagng hook and loop type fastener) strips 22, 24 and 26 are affixed to the upper surface of mat 12 in a U-shape and will receive a flap of material 28 having corresponding Velcro® portions to removably attach thereto. Flap 28 will connect with Velcro® strips 22, 24 and 26 to form a pocket which will receive a compact audio-transmitting device 30. The flap 28 is removable, such that the audio-transmitting device 30 may be interchanged with other types of devices, or may be completely removed so as to utilize the mat without the sound system.

A pair of electrical plugs 32 and 34 are affixed to casing 16 of mat 12 adjacent the pocket for the musical system 30. Plug 34 is electrically connected to an electrical cord 36 affixed within casing 16 of mat 12 and extending to the lower end 12*a* of mat 12. An additional plug 37 at lower end 12*a* of mat 12 projects from the mat to receive an electrical conductor 38 extending from a series of solar panels 40 which may be removably mounted to the lower end 12*a* of mat 12. Solar panels 40 may be attached to the mat using Velcro® 42 (not shown) or the like, such that the solar panels may be removed by unplugging conductor 38 from plug 36 and detaching the panels 40 from Velcro® 42.

The audio transmitter 30 may be plugged into plug 34 so as to receive electrical energy from solar panels 40 if the mat is going to be used in daylight. Other uses of the mat, where inadequate light is present, would require that the musical device 30 be battery powered.

Plug 32 is affixed to mat 12 and electrically connected to electrical cord 44, which is sewn within mat casing 16 and extends up into pillow 14. Cord 44 is then connected to a pair of speakers 46 and 48 located at opposite ends 14*a* of pillow 14. Speakers 46 and 48 should be spaced a great enough distance apart to allow the user to utilize the portion of the pillow between the speakers without interference with the speaker devices themselves. Speakers 46 and 48 are electrically connected through electrical cord 44 so as to transmit either monoaural or stereo recordings.

Pillow 14 is shown as generally cylindrical but may be of any convenient size or shape, and is attached to the upper end 12*b* of mat 12. In this fashion, the mat may be rolled into a cylinder by initiating the rolling of the mat with pillow 14, and wrapping mat 12 around pillow 14.

Figure 2:
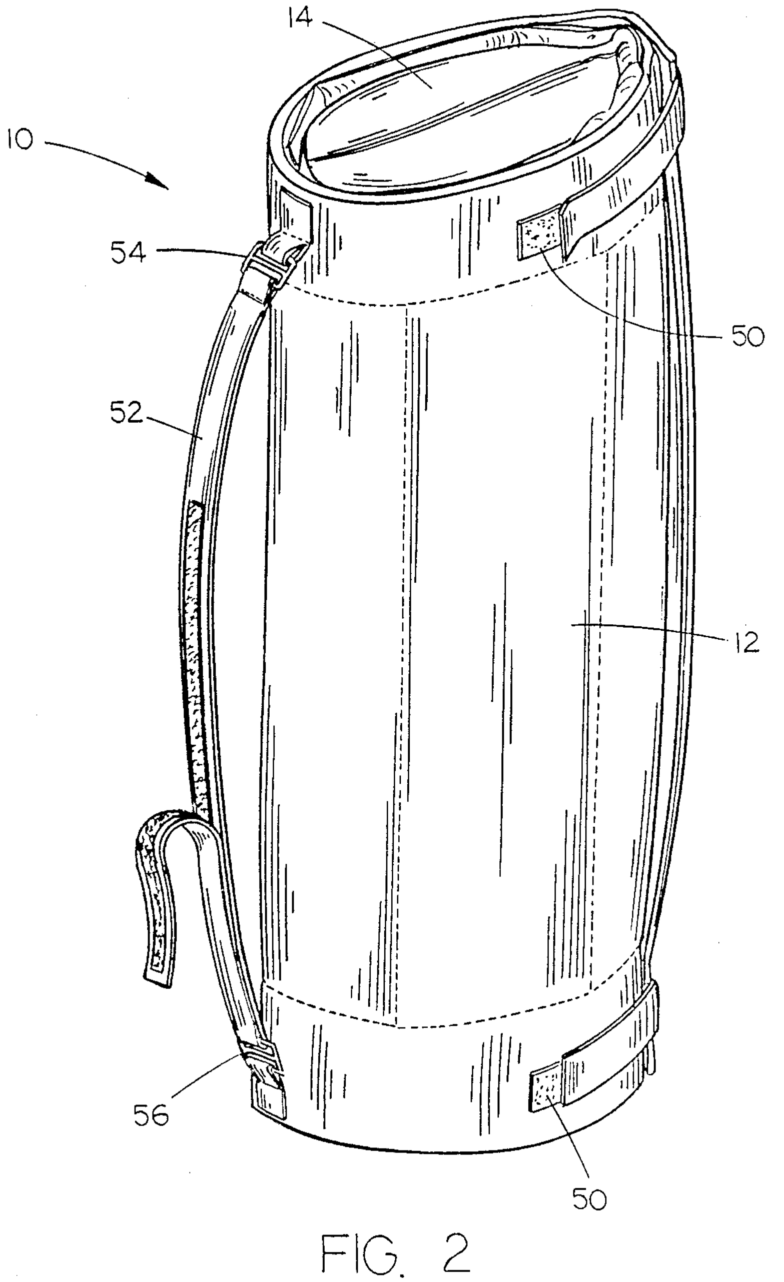
FIG. 2 is a perspective view of the mat when rolled up into a transportable condition.
Figure 5:
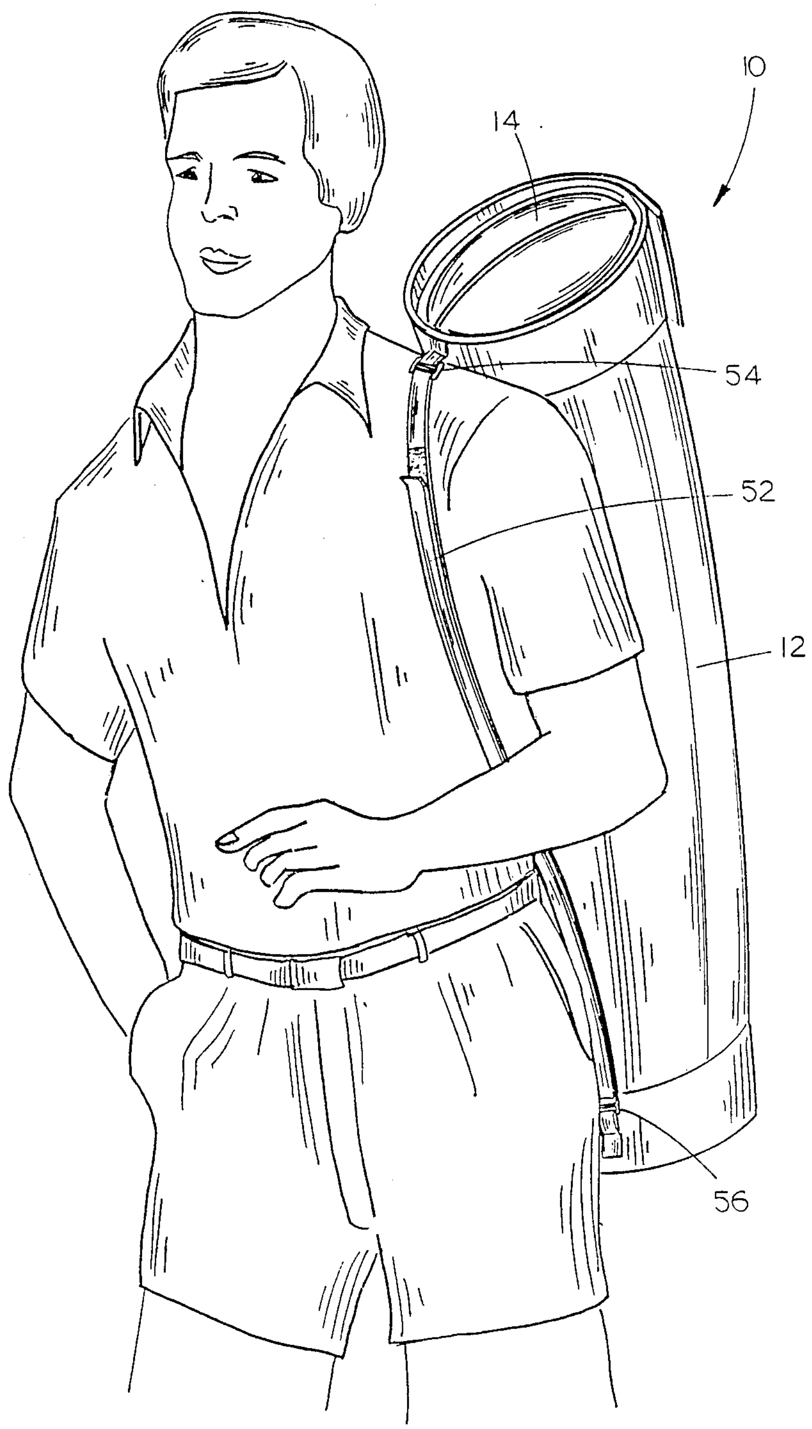
FIG. 5 is a pictorial view of a person transporting the invention.

As shown in FIGS. 2 and 5, the mat and pillow combination may be rolled into a generally cylindrical bundle and fastened by use of Velcro® 50 or other similar connector. A carrying strap 52 extends between a buckle 54 adjacent one edge of mat 12 and buckle 56 adjacent the opposite edge of mat 12. Strap 52 is connected to buckles 54 and 56 so as to be adjustable in length. The mat may then be carried over the shoulder or back by lengthening the carrying strap.

Figure 6:
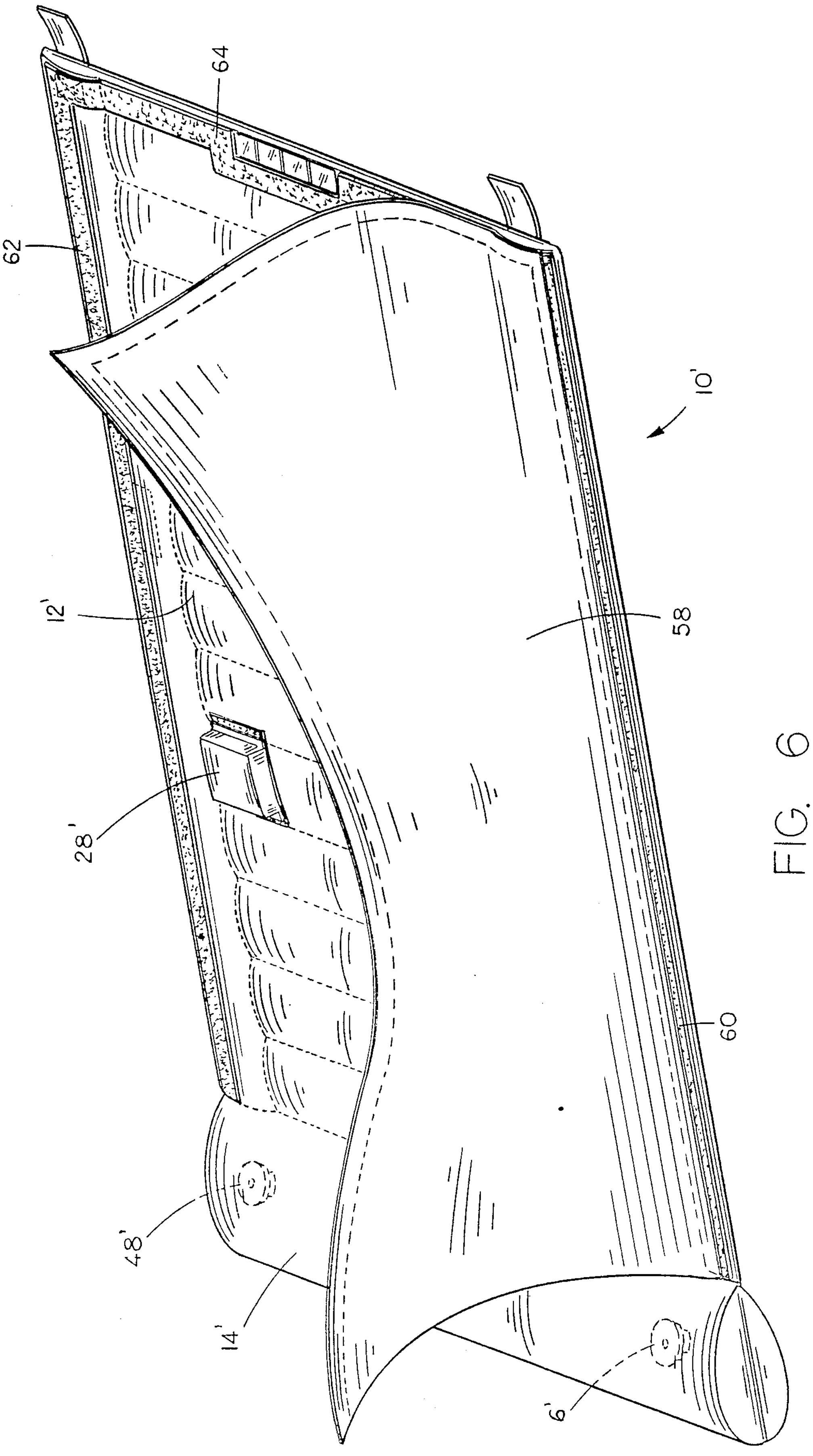
FIG. 6 is a perspective view of a second embodiment of the invention.

Referring now to FIG. 6, a second embodiment of the invention 10' includes a mat portion 12' with a pillow 14' attached at the upper end. An audio-transmitting device 30' is selectively attached to mat 12' within pocket 28', and is electrically connected to speakers 46' and 48' in the same manner as the first embodiment of invention 10.

The musical mat 10' differs from the first embodiment in the use of a cover blanket 58 which may be selectively attached to the upper surface of mat portion 12'. A series of Velcro® strips 60, 62 and 64 are mounted along the longitudinal sides and bottom end of mat 12', respectively, and may be selectively fastened to corresponding strips (not shown) along the side edges and bottom end of blanket 58. In this fashion, mat 10' may be utilized as a sleeping bag, making the mat even more versatile.

Whereas the invention has been shown and described in connection with the preferred embodiment thereof, it will be understood that many modifications, substitutions and additions may be made which are within the intended broad scope of the appended claims. For example, mat casing 16 and padding 18 may be of any desirable material. Likewise, speakers 46 and 48 may be of any convenient size as desired by the user. Thus, it can be seen that the musical mat of the present invention fulfills at least all of the above-stated objectives.

We claim:

1. In combination:

a transportable mat, including a pair of opposite first and second ends, a pair of opposite longitudinal sides, and upper and lower faces;

said mat including a casing having resilient padding material enclosed therein;

a pillow mounted to the first end of said mat, for supporting a person's head;

speaker means mounted within said pillow for producing sound;

electrical conductor means electrically connected to said speaker means, mounted within said pillow and extending within said padding in said mat casing to a predetermined location on said mat; and electrical connector means mounted on an end of said electrical conductor means, and extending outwardly through said mat casing for connection to an electronic audio transmitting means, such that audio signals will be transmitted to said speakers when connected to said connector means.

2. The combination of claim 1, further comprising means for removably mounting audio transmitting means on said mat, located on said mat casing adjacent said electrical connector means.

3. The combination of claim 2, wherein said means for removably mounting audio transmitting means includes a pocket member selectively removably fastened to said mat casing, said pocket member adapted to retain an audio transmitting means in position on said mat when fastened thereto.

4. The combination of claim 1, further comprising audio transmitting means electrically connected to said connector means, and adapted to transmit an audio signal to said speaker means.

5. The combination of claim 1, wherein said speaker means includes first and second speakers spaced apart within said pillow a distance to allow a person's head to be located therebetween.

6. The combination of claim 1, further comprising a plurality of spaced apart transverse and parallel seams formed in said mat, affixing said upper and lower faces together to form a plurality of transverse pockets with said padding material therein, whereby said mat may be rolled in a longitudinal direction to form a cylinder, the seams preventing movement of the padding material therein.

7.

The combination of claim 6, wherein said pillow is connected to said mat with a seam adapted to allow the pillow to be rolled within the mat for transportation thereof.

8.

The combination of claim 7, further comprising selectively operable fastener means on the lower face of said mat adapted to selectively maintain said mat in its generally cylindrical rolled-up orientation, for transportation thereof.

9.

The combination of claim 8, further comprising adjustable carrying strap means mounted transversely on said lower face of said mat, for carrying said mat when it is in its rolled-up orientation.

10.

The combination of claim 1, further comprising:

solar panel means removably mounted on the upper face of said mat adjacent said second end thereof, for converting sunlight to electrical energy;

second electrical conductor means mounted within said mat casing having one end electrically connected to said solar panel means and having a second end extending through said padding in said casing to a point adjacent said first electrical connector means; and second electrical connector means mounted to said second end of said second conductor means, extending outwardly through said mat casing for connection to an electronic audio transmitting means, such that electrical power from said solar panel means will be supplied to the audio transmitting means when connected to said second connector means.

11.

The combination of claim 1, further comprising a cover blanket means selectively attached to said mat to selectively cover the upper face thereof, and operable fastener means selectively and operably fastening said blanket means in position.

* * * * *